United States Patent
Rubino et al.

(10) Patent No.: US 6,685,361 B1
(45) Date of Patent: Feb. 3, 2004

(54) FIBER OPTIC CABLE CONNECTORS FOR DOWNHOLE APPLICATIONS

(75) Inventors: Robert A. Rubino, Tolland, CT (US); Nabil E. Mishriky, Portland, CT (US); Daniel Caisse, Manchester, CT (US); Peter Gumprecht, Southington, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/594,645

(22) Filed: Jun. 15, 2000

(51) Int. Cl.[7] .............................................. G02B 6/38
(52) U.S. Cl. .................................. 385/58; 385/60
(58) Field of Search ....................... 385/58, 53, 55, 385/59, 60, 82–86, 77, 78; 439/752.5, 680, 610, 874

(56) References Cited

U.S. PATENT DOCUMENTS

| | | | | |
|---|---|---|---|---|
| 3,945,700 A | * | 3/1976 | Dider | 439/589 |
| 4,140,367 A | * | 2/1979 | Makuch et al. | 385/59 |
| 4,225,214 A | | 9/1980 | Hodge | |
| 4,252,406 A | * | 2/1981 | Ryan, Jr. et al. | 385/59 |
| 4,759,601 A | | 7/1988 | Knutsen | |
| 4,801,191 A | | 1/1989 | Nakai | |
| 4,802,861 A | * | 2/1989 | Gaston | 439/680 |
| 4,829,407 A | * | 5/1989 | Bushell et al. | 362/29 |
| 5,018,822 A | | 5/1991 | Freismuth | |
| 5,064,268 A | | 11/1991 | Morency | |
| 5,293,581 A | * | 3/1994 | DiMarco | 385/76 |
| 5,301,213 A | | 4/1994 | Linden | |
| 5,384,885 A | * | 1/1995 | Diner | 385/140 |
| 5,433,275 A | * | 7/1995 | Melenyzer et al. | 166/380 |
| 5,590,229 A | | 12/1996 | Goldman | |
| 5,925,879 A | * | 7/1999 | Hay | 250/227.14 |
| 5,928,034 A | * | 7/1999 | Tabata et al. | 439/752.5 |
| 5,997,362 A | * | 12/1999 | Hatagishi et al. | 439/752.5 |
| 6,234,683 B1 | * | 5/2001 | Waldron et al. | 385/78 |

OTHER PUBLICATIONS

International Search Report from corresponding PCT application PCT/US 01/ 15792, dated Mar. 14, 2002.
Packard–Hughes Interconnect Fiber Optic Connectors, Fiber Optic Termini, MIL–T–29504, pp. 1 –9.

* cited by examiner

*Primary Examiner*—Son V. Nguyen
(74) *Attorney, Agent, or Firm*—Moser, Patterson & Sheridan, L.L.P.

(57) ABSTRACT

A connector for joining a first fiber optic cable end and a second fiber optic end includes first and second connector ends adapted to receive the first and second fiber optic cable ends. Each connector end houses a plurality of termini for terminating the fiber optic cable ends. The connector also includes a first alignment feature and a second alignment feature. The first alignment feature includes a plurality of flanges formed on the first connector end to define a plurality of key openings and a plurality of key protrusions formed on the second connector end adapted to fit into the plurality of key openings to ensure proper alignment of the first and second connector ends. The second alignment includes a plurality of termini keys with each termini key being disposed on each of the termini and fitting into a key termnini slot formed in the first and second connector ends for receiving the termini. The first and second alignment features ensure that the first connector end is properly aligned with respect to the second connector end and that each termini disposed in the first connector end is properly aligned with each termini disposed in the second connector end.

30 Claims, 8 Drawing Sheets

FIBER OPTIC CABLE CONNECTORS FOR DOWNHOLE APPLICATIONS

BACKGROUND OF THE INVENTION

1. Technical Field

The present invention relates to connectors for fiber optic cables and, more particularly, to multi-channel connectors that can be used in downhole applications and withstand high temperature and pressure.

2. Background Art

Fiber optic cables have been increasingly used for downhole oil and gas explorations. Specifically, the fiber optic cable is lowered into the well to transmit various information and data to the surface.

The fiber optic cable is typically housed in at least one protective tube to shield the fiber optic from the extremely harsh downhole environment. The fiber optic cable can be subjected to downhole ambient pressures of approximately one thousand (1,000) atmospheres and temperatures ranging from 0° C. to 175° C. (zero to one hundred seventy-five degrees Celsius). Additionally, the fiber optic cable is exposed to water, sulfuric acid, and other downhole corrosives.

Besides harsh temperatures and pressures, there are a number of other requirements that must be taken into consideration for using fiber optic cable in downhole applications. For example, packaging for fiber optic cable must be extremely compact for downhole use. Moreover, the fiber optic cable must come either in extremely long segments or be connected. For installation and assembly purposes, it is much easier to have smaller segments of fiber optic cable that connect to each other. However, the connectors for the fiber optic cable must ensure integrity of the transmitted data and information as well as withstand the harsh ambient conditions of the downhole environment.

Existing connectors are intended for less harsh surface environments and are typically either multi-channel or single channel. Commercially available multi-channel connectors use physical contact type pins or termini. One such termini is MIL-T-29504 which is manufactured by a number of vendors, one of which is Packard-Hughes Interconnect Corporation. However, these termini rely on the termini preload to cause the polished fiber surfaces to physically distort, thereby minimizing the glass-air interface as a strategy to improve the insertion and return loss performance of the termini. Unfortunately, prolonged exposure of the preloaded termini to temperatures in excess of the glass transition temperature of the epoxy used in bonding of the fiber to the termini will cause the fiber to push back, thereby compromising the geometric requirements for both return and insertion loss. Additionally, the connectors that would incorporate these termini do not meet temperature and pressure requirements for downhole use.

Certain single channel connectors are commercially available with angled termini to reduce the return loss of a physical contact connector. These connectors are manufactured with the end surface of the termini polished at an angle such that the Fresnel reflection at the glass-air interface of the termini is reflected at an angle that exceeds the numerical aperture of the fiber. This allows the return loss (reflected energy) of the connector to be reproducibly suppressed by more than one million times or 60 db. However, existing single-channel connectors are rated for temperatures ranging from −40° C. to 85° C., which is substantially inadequate for downhole use. Additionally, pressure rating of the single-channel angled physical contact connectors is not compatible for downhole use. Moreover, the diameter of the angled termini is at least 2.5 mm, which prohibits inclusion into multi-channel connectors that meet the dimensional requirements of the downhole environment.

Therefore, it is necessary to provide a connector for multi-channel use with fiber optic cable such that the connector can withstand the harsh temperatures and pressures of the well environment as well as have appropriate dimensions for downhole use.

SUMMARY OF THE INVENTION

It is an object of the present invention to provide a fiber optic cable connector for multi-channel use that can withstand the downhole environment as well as satisfy dimensional requirements.

According to the present invention, a connector for joining a first fiber optic cable end and a second fiber optic cable end includes first and second connector ends adapted to receive the first and second fiber optic cable ends with each connector end housing a plurality of termini for terminating the fiber optic cable ends, a first alignment feature for properly aligning the first connector end with respect to the second connector end, and a second alignment feature for properly aligning each termini disposed in the first connector end with each termini disposed in the second connector end. The first alignment feature includes a plurality of flanges formed on the first connector end to define a plurality of key openings and a plurality of key protrusions formed on the second connector end adapted to fit into the plurality of key openings to ensure proper alignment of the first and second connector ends. The second alignment feature includes a plurality of termini keys with each termini key being disposed on each of the termini and fitting into a keyed termini slot formed in the first and second connector ends for receiving the termini.

According to one feature of the present invention, each termini includes an angled tip surface for mating with a corresponding termini such that the angled tip surfaces of mating termini are properly aligned with respect to each other as a result of the second alignment feature.

According to another feature of the present invention, the first alignment feature of the present invention also provides protection for the termini.

The double alignment feature of the present invention allows the connector with multiple termini that require specific registration be properly aligned. The angled tip surface of the termini ensures improved connection between the fiber optic cable ends which in turn reduces unwanted reflections from the termini.

According to a further feature of the present invention, a back-shell weld feature includes a welding surface and a capillary opening for facilitating welding of a protective capillary tube shielding the fiber optic cable to the ends of the connector.

One major advantage of the present invention is that the multi-channel connector is sufficiently compact to be used for downhole applications. Another major advantage of the present invention is that the connector can withstand high temperatures and pressures.

The foregoing and other advantages of the present invention become more apparent in light of the following detailed description of the exemplary embodiments thereof, as illustrated in the accompanying drawings.

DETAILED DESCRIPTION OF THE INVENTION

Figure 1:
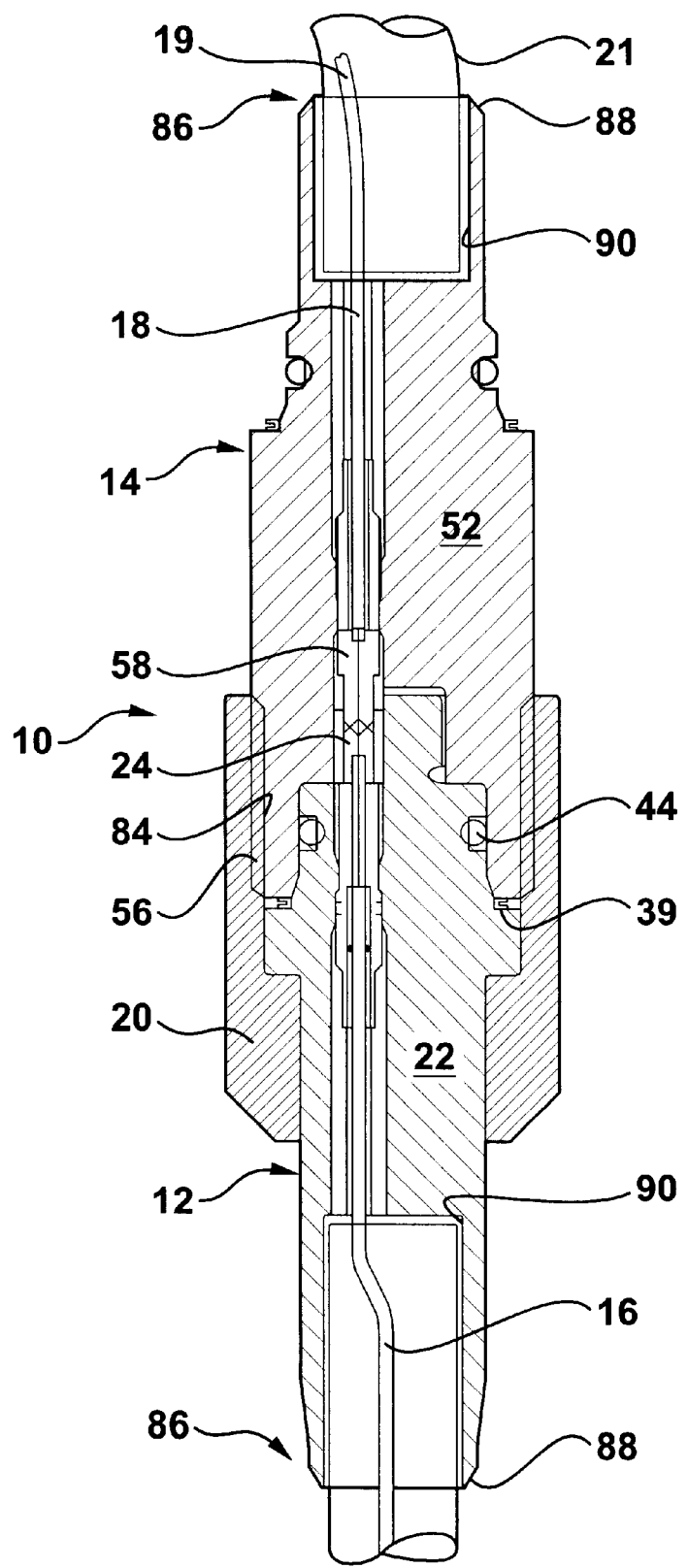
FIG. 1 is a cross-sectional view of a fiber optic connector.

Referring to FIG. 1, a fiber optic connector 10 has a male connector end 12 and a female connector end 14 for joining a first fiber optic cable end 16 and a second fiber optic cable end 18 of a fiber optic cable 19. The fiber optic connector 10 also includes a make-up nut 20. The fiber optic cable 19 is shielded by a capillary encapsulation tube 21.

Figure 2:
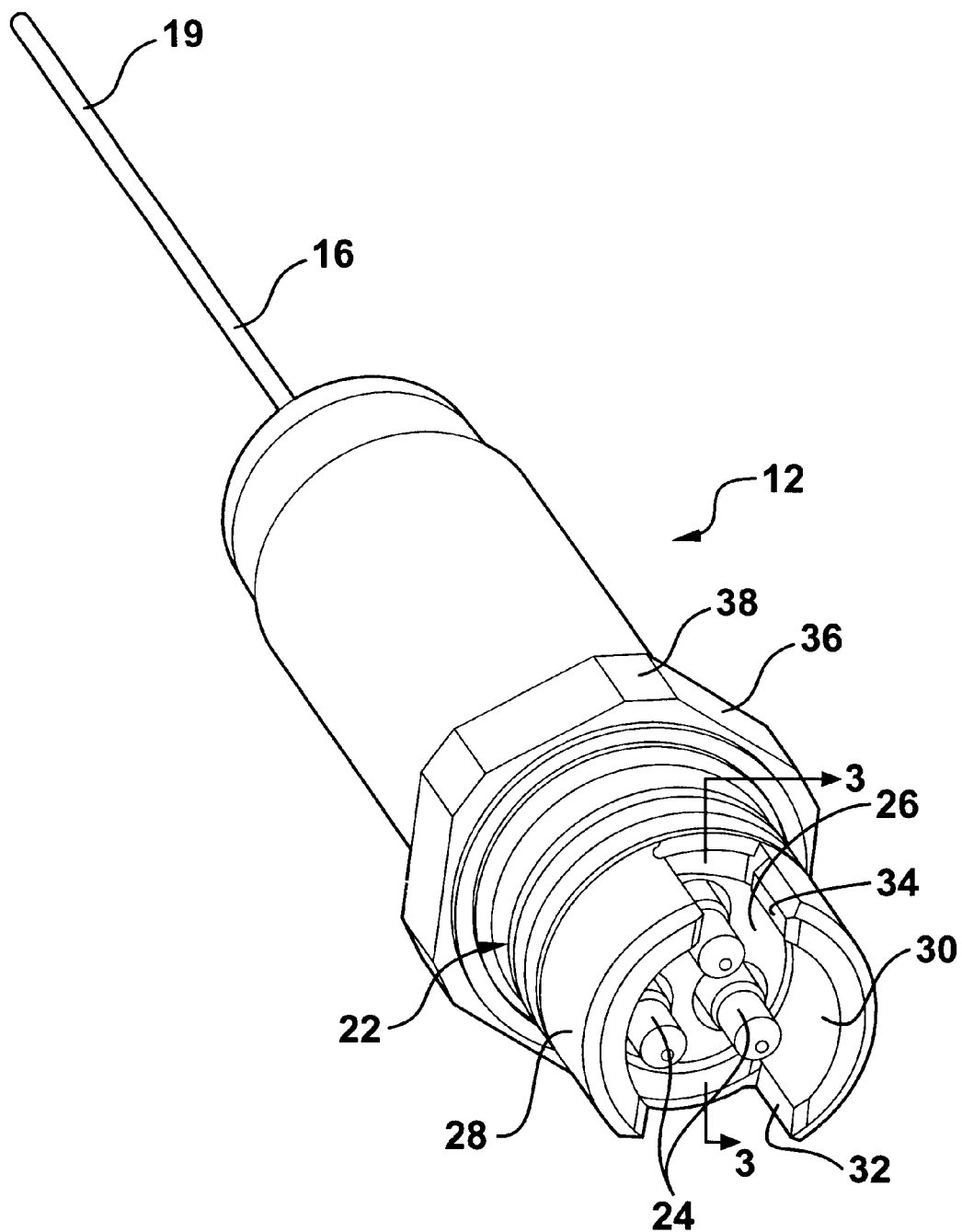
FIG. 2 is a perspective view of a male connector end of the fiber optic connector of FIG. 1.
Figure 3:
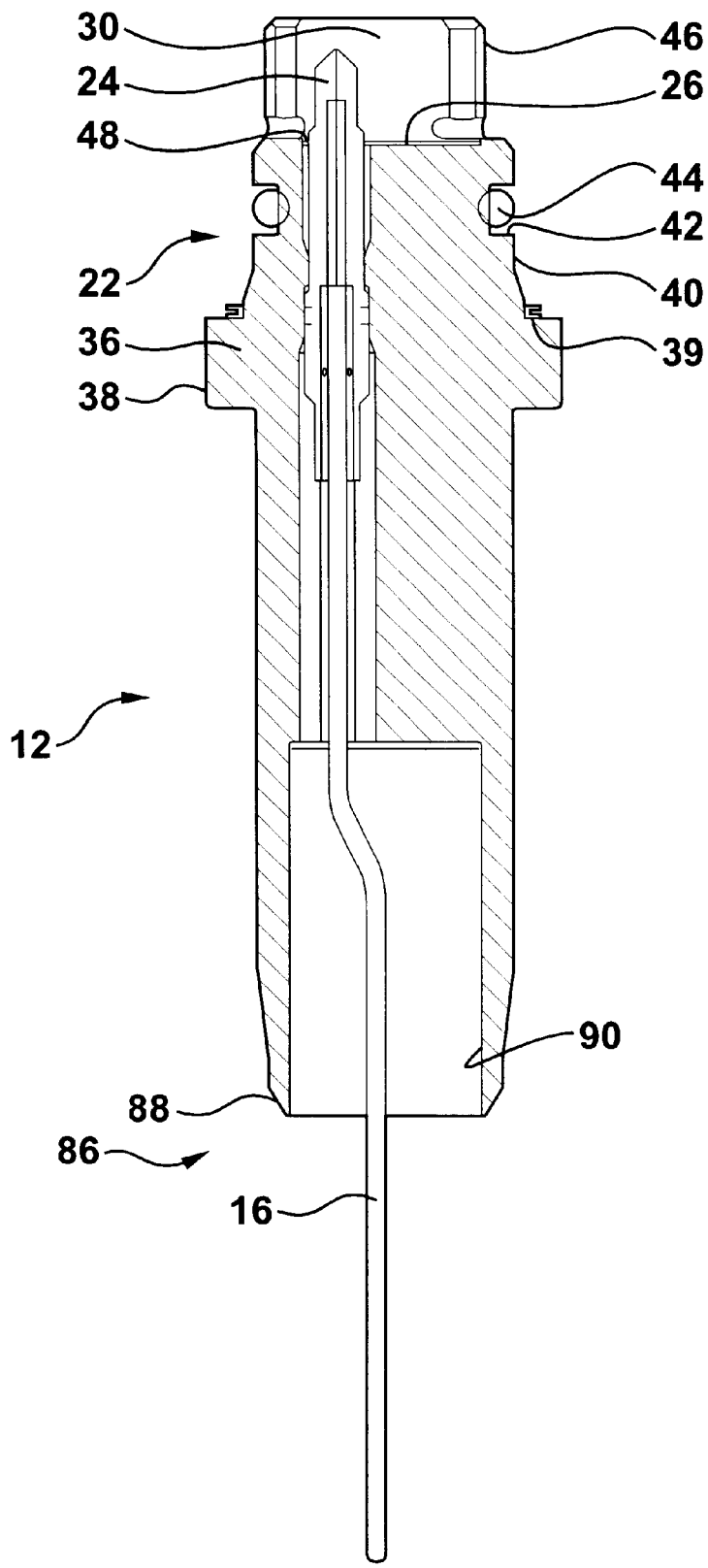
FIG. 3 is a cross-sectional view of the male connector end of FIG. 2 taken along line 3—3.
Figure 4:
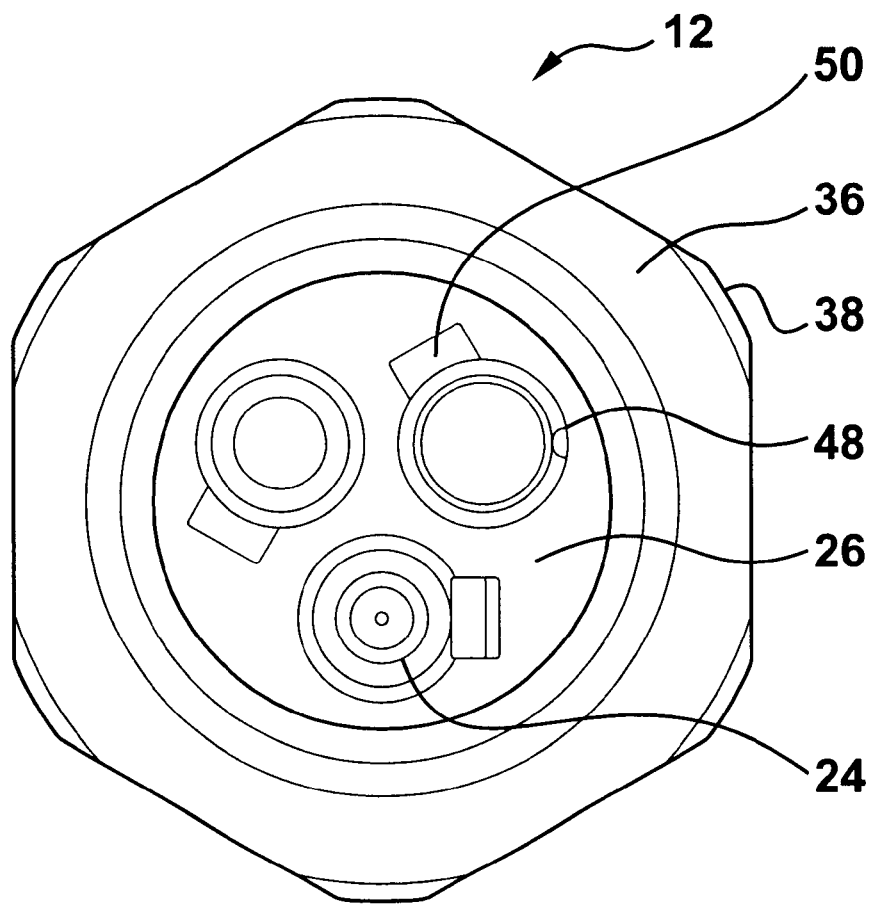
FIG. 4 is a rear view of the male connector end of FIG. 2.

Referring to FIGS. 2, 3 and 4, the male connector end 12 includes a male housing 22 for housing a plurality of male termini 24 protruding outward from a surface 26. A first flange 28 and a second flange 30 also protrude outwardly from the surface 26 protecting the plurality of termini 24 and forming a first key opening 32 and a second key opening 34. The male housing 22 includes a lip 36 having a lip outside diameter 38 for accommodating a metal seal 39. The male housing 22 also has a male housing outside diameter 40 and includes a groove 42 for receiving an elastomeric O-ring 44, as best seen in FIG. 3. The flanges 28, 30 have an outside flange diameter 46.

As best seen in FIGS. 3 and 4, each termini 24 is inserted into a keyed termini receiver hole 48 formed within the first connector end 12. The keyed termini receiver hole 48 includes a keyed slot 50, as best seen in FIG. 4. Each termini 24 is used to terminate the fiber optic cable end 16.

Figure 5:
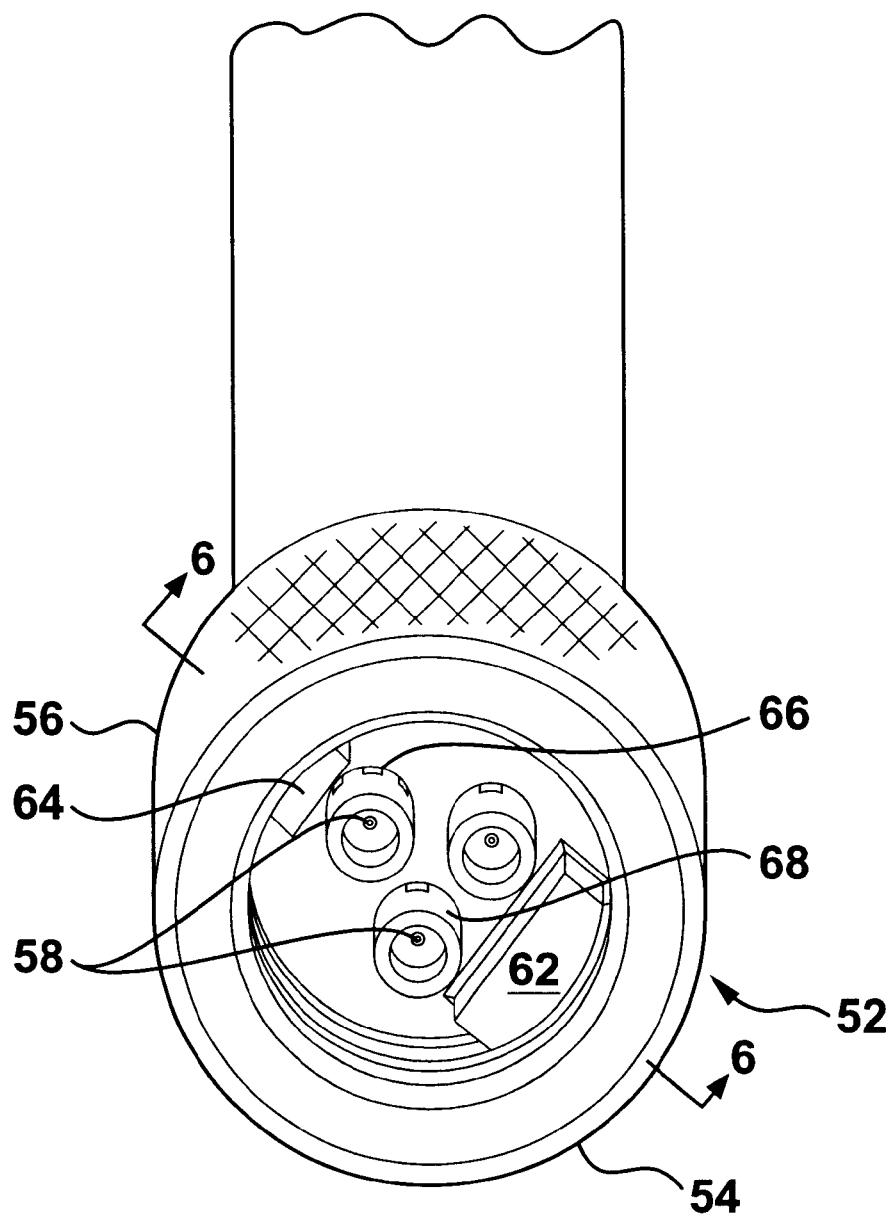
FIG. 5 is a perspective view of a female connector end of the fiber optic connector of FIG. 1.
Figure 6:
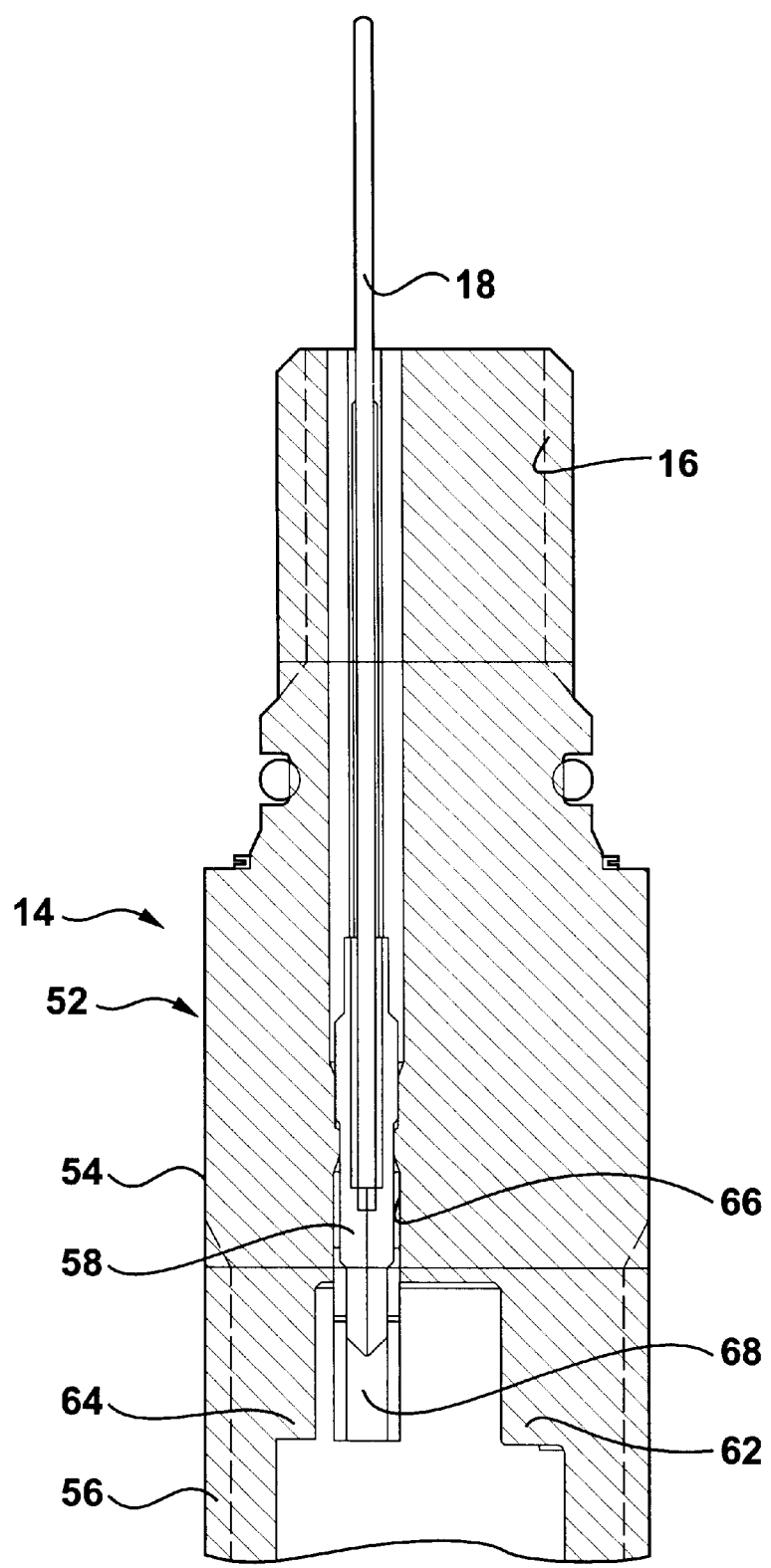
FIG. 6 is a cross-sectional view of the female connector end of FIG. 5 taken along line 6—6.
Figure 7:
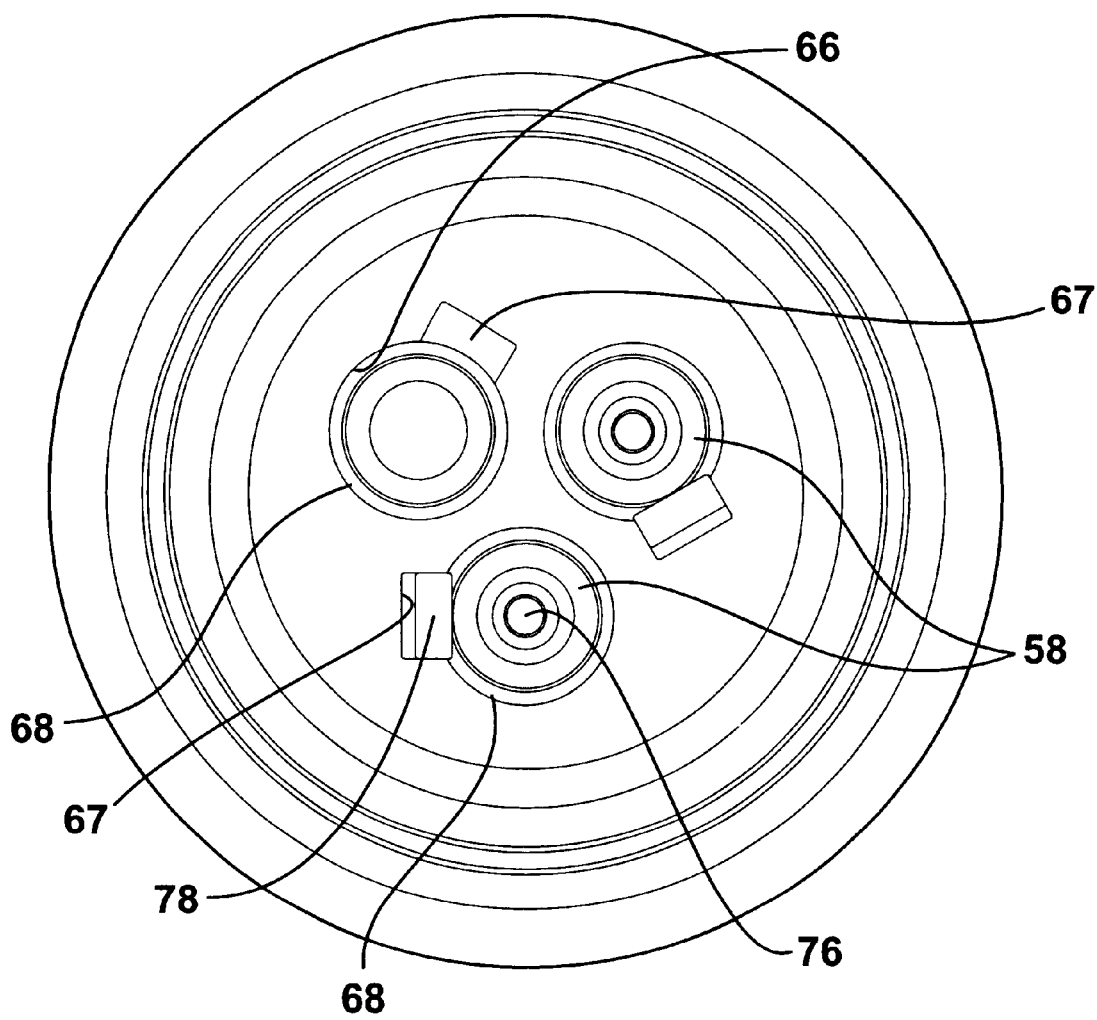
FIG. 7 is a rear view of the female connector end of FIG. 5.

Referring to FIGS. 5, 6, and 7, the female connector end 14 includes a female housing 52 having an outside surface 54 and a plurality of threads 56. A plurality of female termini 58 are disposed within the female housing 52. The housing 52 includes an inside diameter sized to accept the outside diameter 40 of the male housing 22. The female housing 52 also includes a first key protrusion 62 and a second key protrusion 64 adapted to be received within the first key opening 32 and the second key opening 34, respectively. The first key opening 32 and first key protrusion 62 are sized differently from the second key opening 34 and the second key protrusion 64 to ensure proper alignment between the male and female connector ends 12, 14 and, in combination, form a first alignment feature of the fiber optic connector 10. The key protrusions 62, 64 are of sufficient length to prevent engagement of the termini until proper angular alignment between the ends 12, 14 is achieved. The female housing 52 also includes a plurality of keyed termini holes 66 for accepting the plurality of female termini 58. Each termini hole 66 also includes a keyed slot 67 and has a sleeve 68 extending past the outward end of the termini 58.

Figure 8:
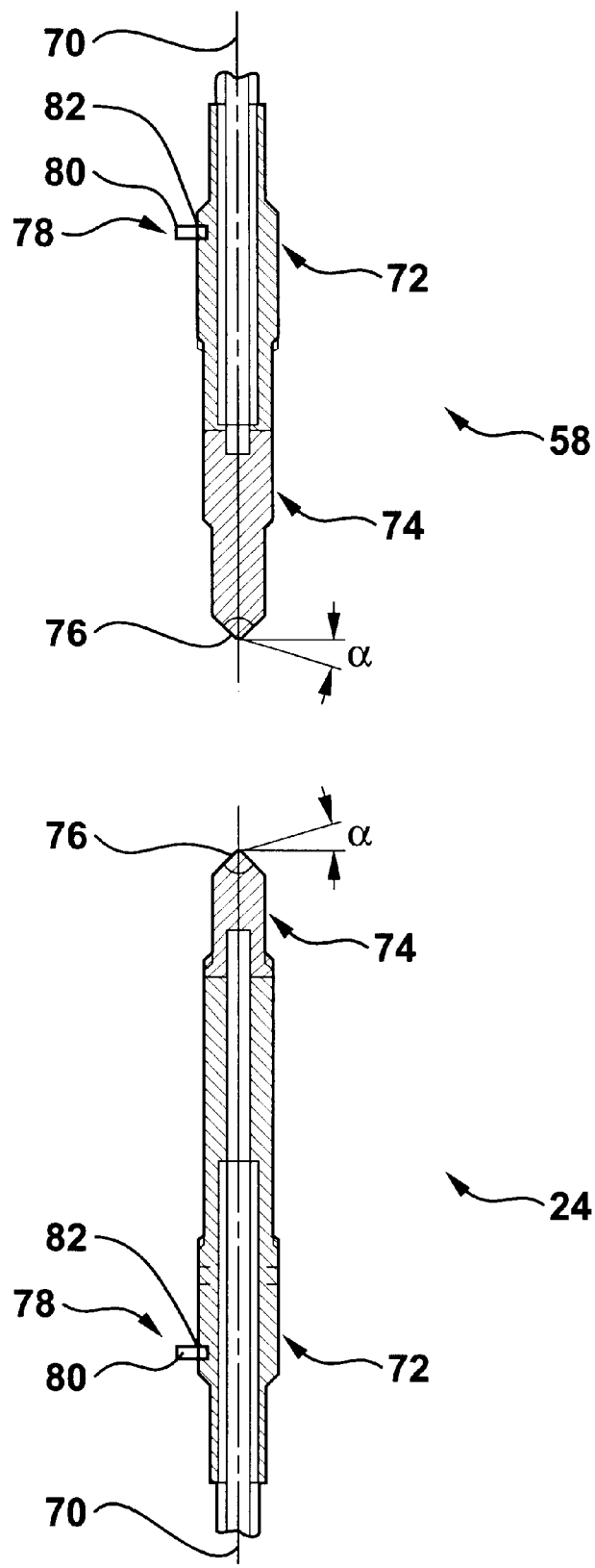
FIG. 8 is a cross-sectional, exploded view of a first termini and a second termini for use in the fiber optic cable connector of FIG. 1.

Referring to FIG. 8, each termini 24, 58 has a central axis 70 and includes a base part 72 and a top part 74 with the top part 74 terminating with a tip surface 76. Each base part 72 of each termini 24, 58 includes a termini key 78. In the preferred embodiment of the present invention, the termini key 78 is a pin 80 inserted in an opening 82 formed within the base part 72 and protruding outwardly therefrom. The tip surface 76 of each termini 24, 58 is angled and forms an angle a with a line perpendicular to the axis 70 of the termini 24, 58. In the preferred embodiment of the present invention, the angle a is approximately eight degrees (8°). The angled tip surface 76 at each termini 24 is formed to mate with the corresponding termini 58 when both termini 24, 58 are properly keyed into respective connector ends 12, 14. For higher numerical aperture fiber the angle a can be increased to approximately fifteen degrees (15°).

Referring to FIGS. 4 and 7, each termini 24, 58 is inserted into the termini keyed hole 48, 66, respectively. Each termini key 78 fits into the corresponding keyed slot 50, 67 of the termini keyed hole 48, 66. The keyed termini slot 50, 67 and the termini key 78 of each termini 24, 58 define a second alignment feature of the fiber optic connector 10 which ensures that the male termini 24 is properly aligned with the female termini 58 for each particular termini connection.

Referring to FIG. 1, the make-up nut 20 is adapted to fit over the male connector end 12 and includes threads 84 on the inside thereof to mate with the threads 56 of the female connector end 14. In the preferred embodiment of the present invention, the nut 20 is fabricated from beryllium copper (BeCu) and, when torqued to specifications, provides sufficient elasticity to prevent back-off.

Referring to FIGS. 1 and 3, the male and female housings 22, 52 also include a back-shell weld feature 86 that incorporates a welding surface 88 and a capillary opening 90 adapted to receive ends of the capillary encapsulation tube 21. Alternatively, the female housing 52 can include threads for receiving threaded tube or other equipment that cannot be welded.

In operation, the connector ends 12, 14 are welded to the encapsulation tube 21 shielding the fiber optic cable 19. The ends of the capillary tube 21 are placed into the capillary opening 90 and welded at the welding surface 88 to attach the connector ends 12, 14 to the capillary tube 21. As the two ends 12, 14 of the connector 10 are joined, the first alignment feature 32, 34, 62, 64 ensures that the two connector ends 12, 14 are properly aligned with respect to each other. Thus, the connector ends 12, 14 are rotated with respect to each other until the first key protrusion 62 and the second key protrusion 64 fit into the first key opening 32 and the second key opening 34, respectively. Once the connector ends 12, 14 are properly aligned with respect to each other, the plurality of male termini 24 fit into the plurality of sleeves 68 and slide to make connection with the female termini 58, as best seen in FIG. 1. The second alignment feature 50, 67, 78 ensures that each termini connection is properly made. Thus, the angled tip surface 76 of each female termini 58 registers with the angled tip surface 76 of the male termini 24, as both termini keys of termini 24, 58 are keyed into their respective slots 50, 67. The angled tip surface 76 of the termini 24, 58 ensures that retro-reflection is minimized. Once the termini connections are made, the make-up nut 20 is secured onto the female portion 14 of the connector 10 by having the threads 56, 84 mate. The metal seal 39, sandwiched between the male and female connector ends 12, 14, provides a primary level of seal protection. The O-ring seal 44 provides a secondary or back-up seal, should the metal seal 39 fail.

In the preferred embodiment of the present invention, the termini 24, 58 are a single channel termini, MIL-T-29504 equivalent, purchased from Packard-Hughes Interconnect Company that have a diameter of approximately two millimeters (2 mm) and have been further modified to include an approximately eight degree (8°) angle on the tip surface 76 thereof and to include the key 78 on the base part 72 thereof.

One major advantage of the present invention is that the fiber optic connector 10 has two alignment features that allow multiple termini connections be made while ensuring proper alignment of each of these termini connections. Another major advantage of the present invention is that this multi-channel connector can be used in downhole applications. The connector 10 of the present invention can operate at temperatures ranging approximately from 0° C. to 175° C., (zero to one hundred seventy-five degrees Celsius) and ambient pressures of approximately one thousand (1,000) atmospheres.

A further advantage of the present invention is that the back-shell weld feature 86 not only facilitates attachment of the connector ends 12, 14 onto the capillary tube, but also acts as both the strength element anchor for the fiber optic cable as well as the environment seal to prevent flooding of the cable.

A number of features of the present invention contribute and ensure that this connector can be used in extremely harsh environment. One such feature is the choice of high strength, corrosion resistant alloys such as Inconel 718 and beryllium copper (BeCu). Another such feature is the thickness and material from which the nut 20 is manufactured. The elasticity of the make-up nut eliminates the need for safety wire or anti-rotation pawls.

While the present invention has been illustrated and described with respect to a particular embodiment thereof, it should be appreciated by those of ordinary skill in the art, that various modifications to this invention may be made without departing from the spirit and scope of the present invention.

What is claimed is:

1. A connector assembly for joining a plurality of first fiber optic cable ends with a plurality of second fiber optic cable ends, comprising:
    a plurality of first termini comprising angled tips, each first termini optically coupled to one of the plurality of first fiber optic cable ends;
    a plurality of second termini comprising angled tips, each second termini optically coupled to one of the plurality of second fiber optic cable ends;
    a key coupled to each of the first and second termini;
    a first housing comprising at least one connector key and a plurality of first termini key slots adapted to receive the keys of the first termini therein; and
    a second housing comprising at least one connector key opening adapted to receive the connector key therein and a plurality of second termini key slots adapted to receive the keys of the second termini therein, wherein the keys of the first and second termini and the termini key slots of the first and second housings together with the connector key slot and the connector key opening define a predefined and fixed relative angular orientation between the respective angled tips of the first and second termini and position corresponding first and second termini in optical communication.

2. The connector assembly of claim 1, wherein the first housing comprises a plurality of connector keys, and the second housing comprises a plurality of connector key openings for receiving the plurality of connector keys.

3. The connector assembly of claim 2, wherein the connector keys have different sizes, and wherein the connector key openings have different sizes to correspond to the sizes of the connector keys.

4. The connector assembly of claim 1, wherein the first fiber optic cable ends are located at a first end of the first housing, and wherein the second fiber optic cable ends are located at a second end of the second housing.

5. The connector assembly of claim 4, wherein the second end of the second housing fits within the first end of the first housing.

6. The connector assembly of claim 4, wherein the first termini and second termini are coupleable.

7. The connector assembly of claim 6, wherein the first termini and second termini are coupleable in a male-female relationship.

8. The connector assembly of claim 4, wherein the connector key is located at the first end of the first housing, and wherein the connector key opening is located at the second end of the second housing.

9. The connector assembly of claim 1, further comprising a nut for coupling the first housing to the second housing.

10. The connector assembly of claim 9, wherein the nut is comprised of beryllium and copper.

11. The connector assembly of claim 1, wherein the at least one connector key opening is defined by at least one flange.

12. The connector assembly of claim 11, wherein the at least one flange is sized to fit within the first housing.

13. The connector assembly of claim 1, wherein the plurality of first fiber optic cable ends extend from a first tube, and wherein the first tube is welded to the first housing, and wherein the plurality of second fiber optic cable ends extend from a second tube, and wherein the second tube is welded to the second housing.

14. The connector assembly of claim 1, further comprising at least seal positionable between the first housing and the second housing.

15. The connector assembly of claim 14, wherein the seal is selected from the group consisting of a metal seal and an O-ring.

16. A method for constructing a connector assembly for joining a plurality of first fiber optic cable ends with a plurality of second fiber optic cable ends, comprising:
    coupling each of the first fiber optic cable ends to first termini, each of the first termini comprising a first key coupled to its outer surface and angled tips;
    coupling each of the second fiber optic cable ends to second termini, each of the second termini comprising a second key coupled to its outer surface and angled tips;
    positioning the first termini within a first housing comprising a plurality of first key slots for receiving the first keys and aligning the first termini with respect to the first housing, whereby relative angular movement between the first termini and the first housing is prevented;
    positioning the second termini within a second housing comprising a plurality of second key slots for receiving the second keys and aligning the
    second termini with respect to the second housing, whereby relative angular movement between the second termini and the second housing is prevented;
    forming at least one connector key on the first housing; and
    forming at least one connector key opening on the second housing for receiving the at least one connector key, aligning the first housing with respect to the second housing and preventing relative angular movement between the first housing and second housing; whereby a registration of the keys and key slots and a registration of the connector key and the connector key opening ensures a predefined and fixed relative angular orientation between the respective angled tips of the first and second termini.

17. The method of claim 16, wherein the first housing comprises a plurality of connector keys, and the second housing comprises a plurality of connector key openings for receiving the plurality of connector keys.

18. The method of claim 17, wherein the connector keys have different sizes, and wherein the connector key openings have different sizes to correspond to the sizes of the connector keys.

19. The method of claim 16, wherein the first fiber optic cable ends are located at a first end of the first housing, and wherein the second fiber optic cable ends are located at a second end of the second housing.

20. The method of claim 19, wherein the second end of the second housing fits within the first end of the first housing.

21. The method of claim 19, wherein the first termini and second termini are coupleable.

22. The method of claim 21, wherein the first termini and second termini are coupleable in a male-female relationship.

23. The method of claim 19, wherein the connector key is located at the first end of the first housing, and wherein the connector key opening is located at the second end of the second housing.

24. The method of claim 16, further coupling the first housing to the second housing with a nut.

25. The method of claim 24, wherein the nut is comprised of beryllium and copper.

26. The method of claim 16, wherein the at least one connector key opening is defined by at least one flange.

27. The method of claim 26, wherein the at least one flange is sized to fit within the first housing.

28. The method of claim 16, wherein the plurality of first fiber optic cable ends extend from a first tube, and wherein the plurality of second fiber optic cable ends extend from a second tube, and further comprising welding the first tube to the first housing and welding the second tube to the second housing.

29. The method of claim 16, further comprising positioning a seal between the first housing and the second housing.

30. The method of claim 21, wherein the seal is selected from the group consisting of a metal seal and an O-ring.

* * * * *